United States Patent
Robinson et al.

(10) Patent No.: US 6,837,551 B2
(45) Date of Patent: Jan. 4, 2005

(54) TOWED VEHICLE BRAKE CONTROLLER

(75) Inventors: Bruce Robinson, Kokomo, IN (US);
Jeffrey Hostetler, Portage, IN (US);
David F. Bailey, Riverview, FL (US)

(73) Assignee: United States Gear Corporation,
Chicago, IL (US)

( * ) Notice: Subject to any disclaimer, the term of this patent is extended or adjusted under 35 U.S.C. 154(b) by 0 days.

(21) Appl. No.: 10/408,500

(22) Filed: Apr. 7, 2003

(65) Prior Publication Data

US 2003/0168908 A1 Sep. 11, 2003

Related U.S. Application Data

(62) Division of application No. 09/292,790, filed on Apr. 14, 1999.

(51) Int. Cl.[7] .............................................. B60T 13/00
(52) U.S. Cl. ....................... 303/7; 188/112 R; 303/20; 303/124; 303/24.1
(58) Field of Search ........................ 303/7, 20, 3, 124, 303/24.1, 15, 192; 188/112 R

(56) References Cited

U.S. PATENT DOCUMENTS

| | | | |
|---|---|---|---|
| 2,177,469 A | 10/1939 | White .............................. 188/3 |
| 3,350,142 A | 10/1967 | Schuman ....................... 303/7 |
| 3,507,541 A | 4/1970 | Ayers ............................. 303/7 |
| 3,610,699 A | 10/1971 | Ladoniczki .................... 303/7 |
| 3,768,870 A | 10/1973 | Howard ......................... 303/7 |
| 3,840,276 A | 10/1974 | Jubenville .................... 303/20 |
| 3,886,339 A | 5/1975 | Jubenville ............ 200/61.45 M |
| 3,897,979 A | 8/1975 | Vangalis ...................... 303/24 |
| 3,907,071 A | 9/1975 | Wells .......................... 188/2 R |
| 3,909,075 A | 9/1975 | Pittet et al. ............... 303/24 C |
| 3,953,084 A | 4/1976 | Pittet, Jr. et al. ............. 303/24 |
| 3,967,863 A | 7/1976 | Tomecek et al. ............... 303/24 |
| 3,981,542 A | 9/1976 | Abrams et al. ............... 303/20 |
| 4,050,550 A | 9/1977 | Grossner ..................... 188/112 |
| 4,072,362 A | 2/1978 | Van Anrooy .................. 303/7 |
| 4,076,327 A | 2/1978 | Hubbard ....................... 303/20 |
| 4,084,859 A | 4/1978 | Bull et al. .................... 303/106 |
| 4,099,790 A | 7/1978 | Hipps ............................. 303/7 |
| 4,122,434 A | 10/1978 | Jensen ....................... 340/52 B |
| 4,295,687 A | 10/1981 | Becker et al. ................ 303/20 |
| 4,370,714 A | 1/1983 | Rettich ........................ 364/426 |
| 4,398,252 A | 8/1983 | Frait ........................... 364/426 |

(List continued on next page.)

OTHER PUBLICATIONS

Ultima™, The Ultimate Brake Control, Brochure.
VIP Tow Brake, Comparison Chart.
BrakeBuddy, Brochure.
Brakemaster Brochure, Roadmaster© 1998.
VacBrake The First Name in Remote Braking Systems, Toadstop.

*Primary Examiner*—Benjamin A. Pezzlo
(74) *Attorney, Agent, or Firm*—George H. Gerstman; Seyfarth Shaw LLP

(57) ABSTRACT

A brake controller, for controlling the brakes of a towed vehicle, having a control module and a power module is provided. The control module is mounted in the cab of a vehicle used for towing, in such a manner that it can be easily seen and accessed by the driver. The control module is provided with an accelerometer, which can read acceleration forces in at least two axes, and a microprocessor which polls the accelerometer and sends braking information to the power module. The control module is also provided with a gain control, to adjust the amount of brake force information, a manual braking lever and a display panel. The power module, which may be mounted in a convenient location, preferably on the towed vehicle, receives the braking information from the control module and secures power from the towed vehicle to engage its brakes.

8 Claims, 7 Drawing Sheets

U.S. PATENT DOCUMENTS

| | | | | |
|---|---|---|---|---|
| 4,398,771 | A | 8/1983 | McCurry et al. | 303/15 |
| 4,414,848 | A | 11/1983 | Shutt | 73/497 |
| 4,721,344 | A | 1/1988 | Frait et al. | 303/20 |
| 4,726,627 | A | 2/1988 | Frait et al. | 303/20 |
| 4,749,238 | A | 6/1988 | Singleton et al. | 303/15 |
| 4,794,269 | A | 12/1988 | Kawata et al. | 307/10.1 |
| 4,849,655 | A | 7/1989 | Bennett | 303/24.1 |
| 4,856,850 | A | 8/1989 | Aichele | 303/20 |
| 5,050,937 | A | 9/1991 | Eccleston | 303/20 |
| 5,058,960 | A | 10/1991 | Eccleston et al. | 303/24.1 |
| 5,079,947 | A | 1/1992 | Feldmann et al. | 73/129 |
| 5,149,176 | A | 9/1992 | Eccleston | 303/20 |
| 5,251,966 | A | 10/1993 | Friederichs et al. | 303/7 |
| 5,251,967 | A | 10/1993 | Eberling | 303/7 |
| 5,255,962 | A | 10/1993 | Neuhaus et al. | 303/11 |
| 5,295,736 | A | 3/1994 | Brearley | 303/7 |
| 5,333,948 | A | 8/1994 | Austin et al. | 303/24.1 |
| 5,347,224 | A | 9/1994 | Brokaw | 324/522 |
| 5,352,028 | A | 10/1994 | Eccleston | 303/20 |
| 5,411,321 | A | 5/1995 | Harness | 303/7 |
| 5,442,332 | A | 8/1995 | Hughes | 340/467 |
| 5,700,068 | A | 12/1997 | Austin | 303/24.1 |
| 5,709,435 | A | 1/1998 | Wood | 303/7 |
| 5,741,048 | A | 4/1998 | Eccleston | 303/20 |
| 5,779,324 | A | 7/1998 | Cords et al. | 303/7 |
| 5,785,393 | A | 7/1998 | McGrath | 303/7 |
| 5,800,025 | A | 9/1998 | McGrath et al. | 303/20 |
| 5,845,730 | A | 12/1998 | Thuen et al. | 180/282 |
| 5,848,826 | A | 12/1998 | Muller | 303/22.4 |
| 5,915,797 | A | 6/1999 | Springer | 303/7 |
| 5,915,798 | A | 6/1999 | Ford | 303/7 |
| 5,929,532 | A | 7/1999 | Sell | 303/3 |
| 6,012,780 | A | 1/2000 | Duvernay | 303/7 |
| 6,012,781 | A | 1/2000 | Gerum | 303/7 |
| 6,050,649 | A | 4/2000 | Hensley | 303/7 |
| 6,068,352 | A | 5/2000 | Kulkarni et al. | 303/20 |
| 6,179,390 | B1 | 1/2001 | Guzorek et al. | 188/3 |
| 6,364,432 | B1 | 4/2002 | Mixon | 303/124 |
| 6,532,419 | B1 * | 3/2003 | Begin et al. | 701/220 |

\* cited by examiner

TOWED VEHICLE BRAKE CONTROLLER

This application is a division of U.S. patent application Ser. No. 09/292,790 filed Apr. 14, 1999.

FIELD OF THE INVENTION

The present invention concerns a novel towed vehicle brake controller.

BACKGROUND OF THE INVENTION

Cars, recreational vehicles and light trucks are presently used to tow other cars or trucks and trailers which are often heavier than the towing car or light truck. Towed vehicles can weigh two or three times the weight of the towing vehicle and can change the driving characteristics of the vehicle when attached. Presently, there are systems which can be installed to aid in better controlling a towing vehicle and towed vehicle combination. These systems are designed to allow for the application of brakes on the wheels of the towed vehicles, either with or without the application of the brakes of the towing vehicle, such that the vehicles may be slowed down and/or stopped and the attitudes of the towed vehicles can be controlled to prevent fish tailing and/or jack-knifing and generally provide for the emergency application of the towed vehicle brakes in the event of separation, or loss of power, from the towing vehicle, known as a breakaway condition. It has been found, however, that the devices of the prior art cannot accurately determine braking condition due to inherent problems in their designs.

These prior art systems are divided into two categories based on the type of braking system used by the towed vehicle. In the case of towed automobiles (cars and trucks) which are equipped with their own braking systems, various types of devices which sense that the towing vehicle is braking and then manually depress the automobile's brakes pedal are available. In the case of trailers, which are generally provided with electronic braking systems, various types of trailer brake controllers which sense that the towing vehicle is braking and then send a control signal back through the towing vehicle to the electric brakes of the trailer are available.

With respect to towed automobiles, the most common types of brake assist devices generally tap into the hydraulic brakes or air brakes of the towing vehicle. The towed automobile's braking system is connected to the brake system of the towing vehicle. By connecting the towed vehicle's braking system in this manner means are provided to both provide power to the towed automobile's brakes and to cause the brakes to be activated when the towing vehicle's brakes are activated. These types of systems detect, by noting the change in the brakes of the towing vehicle, that the towing vehicle is braking and activate mechanical means that push the brake pedal down. It has been found that the control provided by this type of system is limited in that the brakes of the towed vehicle are always applied when the brakes of the towing vehicle are applied. Independent braking, i.e. braking by the towed vehicle without braking by the towing vehicle, to assist in the control of the tow situation is generally unavailable.

Such devices, as the Brake Master and the Toad Stop Vac Brake, allow for the connection of the towed automobile's braking system to the air brakes or vacuum system of a Recreational Vehicle (RV). In these systems, a brake pedal depressor, in the form of an air cylinder, is attached to the frame of the towed automobile and clamped to the brake pedal. The air cylinder is connected to the air brakes of the RV such that the air from the RV will energize the air cylinder. When the brakes of the RV are activated, air from the RV air brake system is sent to the air cylinder, and to the brake system of the towed vehicle, causing the brake pedal of the towed vehicle to be depressed. In situations where the RV has hydraulic brakes or no vacuum system, an air compressor or vacuum system must be installed in either the RV or in the towed automobile. With respect to the systems using an air compressor, a regulator must also be installed in the RV. The regulator senses the movement of the brake pedal in the RV and causes the air compressor to send an appropriate amount of air to the air cylinder, in the towed vehicle, causing the brake pedal of the towed vehicle to be depressed. These installed air systems may also provide the vacuum needed to operate the automobile's brake system.

Other towing vehicle-automobile brake system, such as the Brake Buddy, comprise basically a box with an air cylinder and a plunger which is placed into the driver area of the towed automobile. These types of devices are plugged into the cigarette lighter of the automobile, or are otherwise connected to the automobile's electrical system, while the plunger is clamped to the brake pedal of the towed automobile. Within the box, of the device, a pendulum-activated switch and an air compressor are included. When the pendulum swings so that it activates the switch, the air compressor is activated and the plunger pushes the brake pedal down. These devices are touted as being convenient in that they need only be dropped into the towed automobile, plugged in and clamped to the brake without having to be connected to the towing vehicle's brakes or other systems. The accuracy of these devices, in detecting braking situations is questionable in that unless the vehicle is traveling on a level road or running at constant velocity, the pendulum switch is subject to misidentifying the swing caused by a slope in the road or a change in velocity as a braking situation. Further, the operator of the towing vehicle has no control over this device from the towing vehicle. Any adjustments to the system must be made while both vehicles are stationary, making accurate adjustments very difficult. Also, these devices operate in vehicles that are not running and, therefore, must use great force to depress the brake pedal. In order to be effective these devices must be able to produce this amount of force quickly. Finally, the devices, which comprise means to depress the brake of an automobile without power assisted brakes, are generally bulky and heavy and are difficult to install and remove. The devices must be removed in order to operate the towed vehicle independently of the towing vehicle.

With respect to devices designed to apply the brakes of trailers, there are presently several controllers that can automatically apply the trailer's brakes to assist the driver of the towing vehicle. Since trailer brakes are generally electronically activated it has been found that means can be used to determine the degree to which the towing vehicle is slowing and translate that information so that the brakes of the trailer may be applied. These controllers generally take the form of a box, housing all of the electronics including the means to determine that the towing vehicle is braking and the degree to which it is braking, and a power amplifier to send electricity to the trailer's brakes to accomplish braking. These prior art trailer brake controller, further, generally, comprise a control panel which allows the user to manually control braking, adjust the amount of braking and provide some maintenance, such as leveling of the device. The control panel of a brake control device also generally has a light display to indicate the degree of braking power.

It has been found that these trailer brake controllers are generally too large and bulky to be installed in such a manner that the control panel can be both seen by the driver and reached by the driver. Since the controller must be accessible to the driver of the vehicle, the controllers are generally mounted under the towing vehicle's dash board so that the controls can be reached. Although such mounting allows the driver to reach the controller, it generally places the controller out of the direct sight of the driver. Further, the driver must usually take his hand from either the steering wheel or the gear shift lever of the vehicle to operate the controller. To allow the driver to see the control panel while reaching the controls, when possible, these controllers have been mounted along a vertical wall of the dash boards of some vehicles. While this allows for a better view of the controller, such mounting has generally been found to take the device out of level or cause the device to have limited brake sensing abilities.

Trailer brake controllers typically are electrically connected to the power source of the towing vehicle, to the brake lights of the towing vehicle (as a means of detecting braking) and to the brakes of the towed vehicle. In connecting a trailer brake controller, heavy gauge wires have been used to carry power from the battery to the controller and amplified power from the controller to the brakes. Typically there is a battery wire (a large positive), a large wire going to the brakes, and some slightly smaller wires for ground and for the brake light signal. These controllers effectively take power from the battery, amplify it, and apply it to the trailer's brakes. Thus relatively high current from the towing vehicle is carried from the battery of the towing vehicle through the controller and back to the towed vehicle. Heavy gauge wire has been used in these devices as power from the car battery must be taken to the cab of the towing vehicle, amplified (to provide generally 2.5 amps of power to each trailer brake) by the controller, and then taken back through the entire length of the towing vehicle to each of the towed vehicle's brakes. It has been found that the distance from the controller to the brakes of the towed vehicle is a source of resistance and loss of electrical energize Further, in trailer brake controllers of the prior art, electrical power is continuously provided between the towing vehicle and the towed vehicle so that it can be available immediately. Thus, when a trailer is not attached to a vehicle in which a trailer brake controller has been installed, the trailer brake controller continues to provide electricity to the wires that energize the braking system providing electricity to the open hitch socket plug. This situation not only creates the hazard of electrical shock, it has also been found that the exposure of the electrically charged socket plug, of the trailer hitch, to the atmosphere causes the connectors within the plug to more rapidly oxidize adding to the electrical resistance in the system. As a result, trailers with large number of brakes often cannot be supplied with all of the power needed for braking.

Presently, the most popular types of trailer brake control devices are proportional controllers and digital controllers. Proportional controllers generally use a dynamic accelerometer in the form of a pendulum that measures the force of braking, or deceleration, in the towing vehicle and applies the towed vehicle's brakes accordingly. The pendulum, which generally swings in the plane of the axis of motion of the towing vehicle, measures force by the degree of swing, from a default position, which the application of the towing vehicle's brakes causes in the pendulum. A greater swing by the pendulum would denote a greater urgency in braking and the proportional controller responds by greater application of the brakes. Pendulum based systems lose reliability when the device is not initially leveled, loses its level, or if the device, due to road conditions, slope of the road, etc. is not correctly level at the time of use. All pendulum based devices must be maintained level in order to operate effectively. It has been found that few of these systems maintain level and often, these systems are never level, even at the time of their installation. It has also been found that mounting these controllers along a vertical wall of the dash board of the vehicle limits the swing of the pendulum to such an extent that accurate measurement of braking may be greatly compromised.

Digital controllers do not use a pendulum to measure the force of braking. Instead digital devices provide braking by sensing the amount of time that the towing vehicle's brakes are applied and applying brakes on the towed vehicle accordingly. Since the amount of time a brake is applied is indicative of the force needed to stop the vehicle, digital controllers use brake time as the means of determining the braking needs of the towed vehicle. When the driver of the towing vehicle presses the brake pedal down for a long period of time, the digital controller interprets this to indicate the need for greater braking power in the trailer. Conversely, holding the pedal down for a small amount of time is interpreted as a need for a small amount of brake force in the trailer. Digital controllers can sense the amount of braking in the towing vehicle through connection to brake components of the towing vehicle. The components, to which such sensors can be connected, include the brake lights, the brake pedal or hydraulic brake lines of the towing vehicle. When the digital controller senses that the brakes have been applied, the sensors determine the amount of braking applied and apply the brakes of the towed vehicle. This manner of acquiring braking information has been found to be unreliable as brake components can easily lose adjustment, react differently in different weather or road conditions and may not provide reproducible results each time they are read by the controller.

Digital controllers generally are provided with a component, such as a gain control knob, that enables the operator to provide a delay of generally between two and twelve seconds for the brake controller to respond to the braking of the towing vehicle. The operator may make adjustments that cause the brakes of the towed vehicle to respond in a desired manner. A delay in the towed vehicle's braking may be desired in different types of traffic and weather situations when the application of the towed vehicle's brakes in response to a quick application of the towing vehicle's brakes may be unnecessary or dangerous. It has been found however, that a delay of even two seconds in a panic stop situation with a heavy towed vehicle may be dangerous.

Both the proportional and digital controllers are generally provided with manual controls, allowing the driver to apply the towed vehicle brakes with, for example, a slide bar or lever. However, as both types of devices must generally be mounted under the dashboard, in emergency situations, manual control of braking may cause the dangerous situation of the driver removing his hands from the steering wheel or taking his eyes off of the road. Further, braking can often times be assisted by use of the vehicle's engine and transmission by downshifting. However, if the driver must reach down to control the brakes of the towed vehicle he must either take his hands off of the steering wheel of the vehicle or off of the gear shift controller.

One manufacturer of trailer brake controllers has included a joy stick device that allows the user to manually apply the trailer brakes through a wired remote control connected to one of the types of controllers described above. This device, the Hayes Wheels Micro Control HD Plus, when used with the optional "Manual Remote", allows the operator to manually apply the trailer brakes by holding the joy stick and pressing a button. However, the device does not comprise any means for sensing the need for brakes or for providing information concerning current braking conditions to the driver. Instead it is merely a manual braking slide control similar to the manual slide controls on other prior art trailer brake controllers. Further, the driver must have the joy stick in his hand or near his hand in order to be able to use the joy stick.

In another towing vehicle-trailer braking system, the Ultima Braking System, a sensor for determining the degree to which the towing vehicle's brake pedal is depressed is provided. The sensor causes an electrical signal to be sent to the trailer brakes. The sensor comprises a displacement sensitive manual control module that is mounted to the brake arm of the towing vehicle. Braking information is sent to the display module which is mounted in a convenient location in the cab of the towing vehicle. Adjustments to the manual control module may be made using the display module. However, the display module contains no inertia activated components and no pendulum. Although a display is provided in a viewable position, the device has all of the other shortcomings discussed with respect to other prior art proportional controllers, including the need to continually synchronize the brakes of the towed and towing vehicles.

We have invented a novel brake controller which can be used with both towed trailers and towed automobiles. Our invention allows the driver of the towed vehicle to view the display panel of a controller and have access to the manual brake controls provided. In our invention, the controller accurately determines the existence of a braking situation and sends a signal to a separate power module, which may be installed in the towed vehicle, to provide drivers to supply power to the brakes of the towed vehicle as needed. Our invention allows the separate power module to be connected to the power source of the towed vehicle so that power is not lost between the front of the towing vehicle and the towed vehicle brakes.

It is therefore an object of the present invention to provide a means to mount a control apparatus comfortably in the cab of a towing vehicle so that the brakes of a towed vehicle may be controlled accurately and without the driver having to take his eyes off the road to use the controller.

It is another object of the present invention to provide a trailer brake control device that accurately measures the deceleration of the towing vehicle and translates and causes the brakes of the towed vehicle to be applied correctly.

It is a further object of the present invention to provide a trailer brake controller that has a power module mounted closer to or on the towed vehicle so that electrical energy loss, due to resistance, is lessened.

It is a further object of the present invention to provide a power module which activates the brakes of the towed vehicle only when needed such that electrical energy need not be continuously provided between the towing vehicle and the towed vehicle.

It is a further object of the present invention to provide a brake system controller that can control the brakes of a towed car or truck using means to accurately measure the deceleration of the towing vehicle, translating those measurements and applying the towed vehicle's brakes accordingly.

It is a further object to provide a brake controller for use with a towed automobile that causes the brakes of the towed automobile to be controlled accurately by means of measurement of the braking forces on the towing vehicle and by manual means.

It is a further object of the present invention to provide a control module for a brake controller that can be used on both trailer and towed automobile systems.

Other objects and advantages of the present invention will become apparent as the description proceeds.

SUMMARY OF THE INVENTION

In accordance with the present invention, a brake controller is provided, for use with a towing vehicle when the towing vehicle is in association with a towed vehicle. In an illustrative embodiment, the brake controller comprises a control module for location within the cab of the towing vehicle and comprising a user interface with gain and manual braking controls and automatic braking sensors. A power module is provided, separate from said remote control module, comprising power drivers for supplying power to activate the brakes of the towed vehicle. The control module is connected to the power module such that when the control module is activated the power drivers of the separate power module operate to activate the brakes of the towed vehicle.

In the preferred embodiment of the invention, the control module is mounted in a location convenient to the driver of a towing vehicle, such as on the gear shift lever or on the dashboard of the towing vehicle. In this manner control of a towed vehicle's brakes can be maintained comfortably by the driver with his eyes on the road and at least one hand on the steering wheel while having the other the other hand available for shifting gears or manipulating the controls of the brake control module. With the control module so mounted, the power module may be connected anywhere in or on the towing vehicle or in or on the towed vehicle, such that it can derive the power needed to apply brakes from the power source of the towing or towed vehicle. As the power module takes power from the towed vehicle, communication between the control module and the power module may be made using relatively light gauge wire.

In the preferred embodiment, the control module comprises a manual brake lever and a gain control knob and automatic braking sensors, including a multi-axis accelerometer and a microprocessor, that produce braking signals which are sent to the power module. In the preferred embodiment, a dual accelerometer is used, however, it is to be understood that the term "multi-axis accelerometer" includes all accelerometers that sense force on at least two axes. As the accelerometer senses forces in at least two axes of movement of the towing vehicle, leveling of the brake controller is not necessary. The microprocessor is connected to the braking system of the towing vehicle, preferably through its brake lights. The microprocessor is also connected to the manual brake lever, the gain control knob and the accelerometer of the controller, and a power source in the towing vehicle.

In one embodiment, the microprocessor continually polls the accelerometer to determine instantaneous acceleration forces on the towing vehicle. When the brakes of the towing vehicle are engaged, its brake lights are lit sending a signal to the microprocessor. The microprocessor sets its previous reading of the accelerometer as a base and computes the change in forces therefrom, generating a braking signal, preferably in the form of a pulse modulated signal, which is sent to the power module.

In the preferred embodiment, the power module comprises power drivers, signal receivers, a microprocessor and power amplification means. Upon receipt of a braking signal from the control module, the power module compares the signal to acceptable braking signals. If the present signal is a true braking signal, the power module cause the power drivers and amplification means to produce braking power for the towed vehicle.

The preferred embodiments of the present invention are designed for operation in situations where the towed vehicle is an automobile, having its own power braking systems, and in trailers having electronic brakes.

A more detailed explanation of the invention is provided in the following description and claims and is illustrated in the accompanying drawings.

DETAILED DESCRIPTION OF THE ILLUSTRATIVE EMBODIMENT

Figure 1:
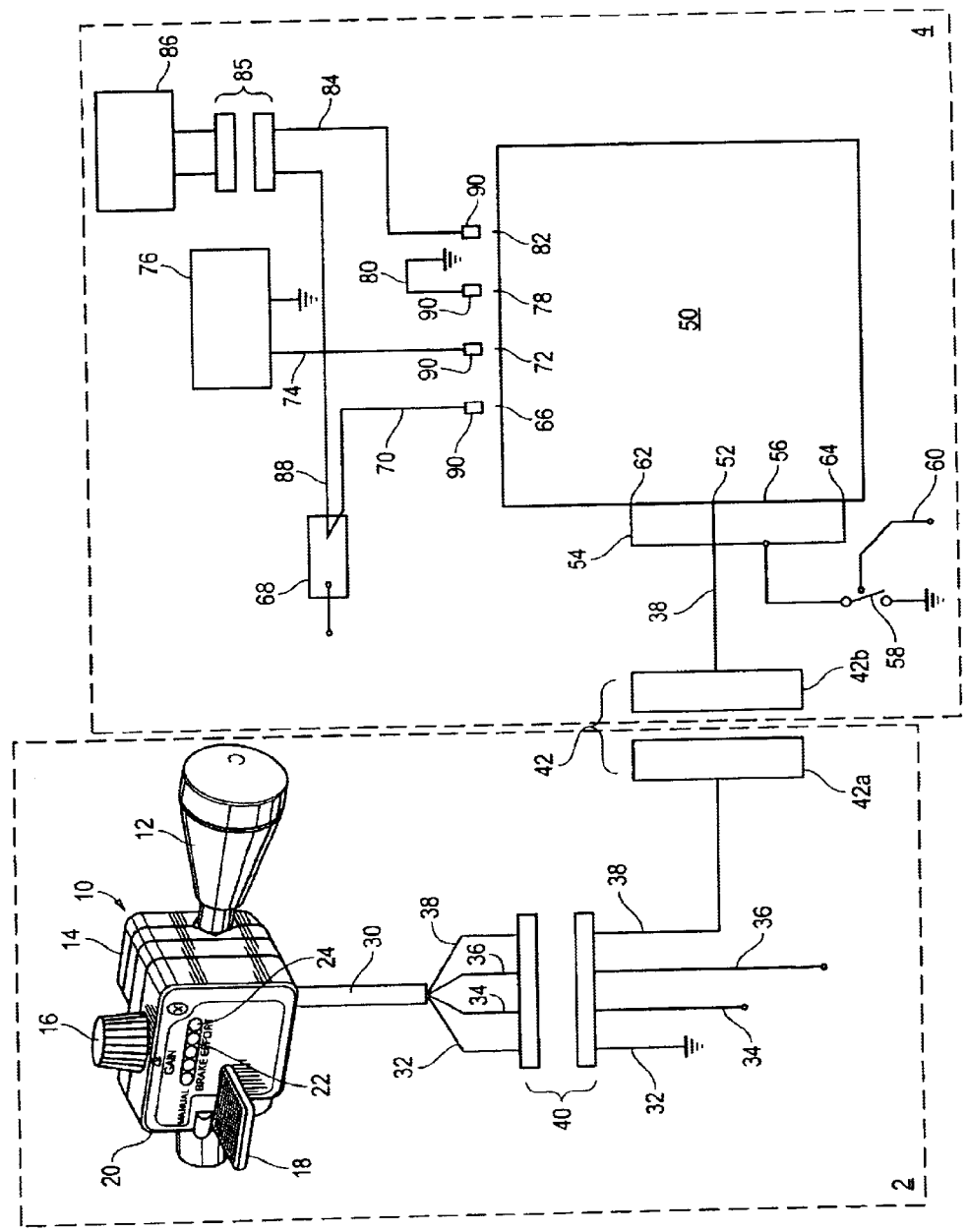
FIG. 1 is a schematic diagram, including a perspective view of a remote control module, of a brake control system in accordance with the principles of the present invention.

Referring to the drawings, FIG. 1 shows a wired remote control module 10 constructed in accordance with the principles of the present invention and illustrates a control module 10 of a system in which a towing vehicle is towing an automobile having an independent braking system. For clarity in FIG. 1, those parts of the present invention which in a preferred embodiment are housed in the towing vehicle are shown in box 2 and those part of the present invention that are housed in the towed vehicle are shown in box 4.

Control module 10 is shown attached to a gear shift lever 12 of a towing vehicle. It is to be understood, however, that control module 10 may be attached to any convenient location within the passenger compartment of the towing vehicle, such as on the vehicle's dashboard. Control module 10 comprises a housing 14, gain control knob 16, a manual control lever 18, and a lighted display panel 20. Lighted display panel 20 may include brake force light emitting diodes (LEDs) display 22 that show the braking force being applied to the towed vehicles brakes, and a status LED 24 that indicates system status. Control module 10 further comprises a microprocessor, an accelerometer, a buzzer (or other audio alert device) and circuitry that will be discussed below. Control module 10 works with a power module, shown as power module 50 in FIG. 1 and power module 92 in FIG. 2. In the preferred embodiments, control module 10 is physically separate from the power module FIG. 1 shows that control module 10 is coupled, within the towing vehicle, to a line 30 having a ground line 32, ignition line 34, a brake light line 36 and a control line 38. These lines are then connected to one half of a pin and socket connector 40 for ease of connection to a ground, braking lights and ignition switch of the towing vehicle, which lines are wired to the other half of pin and socket connector 40.

As will be described in greater detail below, when control module 10 is installed in the vehicle, ignition line 34 provides power to control module 10, brake light line 36 provides a determination that braking is occurring, ground line 32 provides the necessary ground for the system and control line 38 provides connection of the control module 10 to the braking system of the towed vehicle.

Ground line 32, ignition line 34, brake light line 36 and control line 38 may comprise light gauge wire, or "control wire", preferably 18 gauge. Control line 38 may be replaced with a signal transmission system, such as an RF, infrared, ultrasonic or other signal transmitter, without departing from the novel scope of the present invention. The control line 38 is coupled through a hitch socket plug 42 with side 42a on the towing vehicle and side 42b on the towed vehicle. It is to be understood that hitch socket plug may be of a conventional type, used to connect brake light and turn signal indicator systems, as well as prior art brake control systems, between towing and towed vehicles.

The socket plug 42b is coupled through control line 38 to a power module 50, through a control input 52. Power module 50 may be mounted in any convenient place, in the towing vehicle-towed vehicle combination, without departing from the novel scope of the present invention. For example, power module 50 may be mounted in the towing vehicle or in the towed vehicle. Control line 38 is connected to power module 50 using conventional means such as a connector 54. Power module 50 produces, in a manner described in greater detail below, a status signal which it returns to control module 10 and status LED 24 through control line 38. While the system is working, LED 24 glows on control module 10.

Power module 50 further comprises a breakaway switch input 56. A breakaway switch 58 is connected to switch input 56 on power module 50, through socket connector 54. A lanyard 60 is attached between the towing vehicle and the breakaway switch 58 on the towed vehicle such that should the vehicles separate, lanyard 60 will rupture breakaway switch 58 causing breakaway switch 56 to be actuated. The results of the actuation of breakaway switch 56 will be discussed in greater detail below.

Power module 50 further comprises brake light switch control lines 62 and 64. Lines 62 and 64 are used to interrupt the brake light switch signal for the car being towed, as will be discussed in greater detail below. Inputs 52 and 56 are relatively low power signal lines and do not require heavy gauge wire.

Power module 50 comprises a battery connection output 66, from which the battery of the towed vehicle (not shown) is connected to circuit breaker 68 of the towed vehicle via line 70. A vacuum pump output 72 is connected, via line 74, to a vacuum pump 76 supplied to the towed vehicle. A ground input 78 is provided on power module 50 and appropriate grounding is provided via line 80. An actuator output 82 is provided on power module 50 and is connected, via line 84 and pin and socket connection 85, to an actuator 86 provided on the towed vehicle. It is to be understood that actuator 86 may take the form of a solenoid, gear motor, air cylinder, hydraulic cylinder or other type of actuating device which can provide the necessary force to cause the brake pedal of an automobile to be depressed, without departing from the novel scope of the present invention. In one of the preferred embodiments of the present invention, actuator 86 is a solenoid. Vacuum pump 76 provides the vacuum needed to run a power braking system while the automobile's own system is turned off. Actuator 86 operates the brakes of a towed automobile by providing the force necessary to depress the brake pedal of an automobile. While a pin and socket connection 85 is illustrated and described, any conventional means of connection between line 84 and actuator 86 may be used without departing from the novel scope of the invention. Actuator 86 is powered by the battery of the towed vehicle through circuit breaker 68 via line 88 which is connected to pin and socket connection 85. Lines 70, 74, 80 and 84, which are preferably of heavy gauge wire, such as 10 gauge wire, are connected to power module 50 through conventional means such as ¼ inch insulated tabs 90. Line 88 may also be comprised of heavy gauge wire. Power module 50 produces, in a manner described in greater detail below, a status signal which it returns to control module 10 and status LED 24 through control line 38. The absence of the status signal is a warning to the operator of the towing vehicle that a problem, such a separation of the vehicles, has occurred. The operation of power module 50 will be described in greater detail below.

Figure 2:
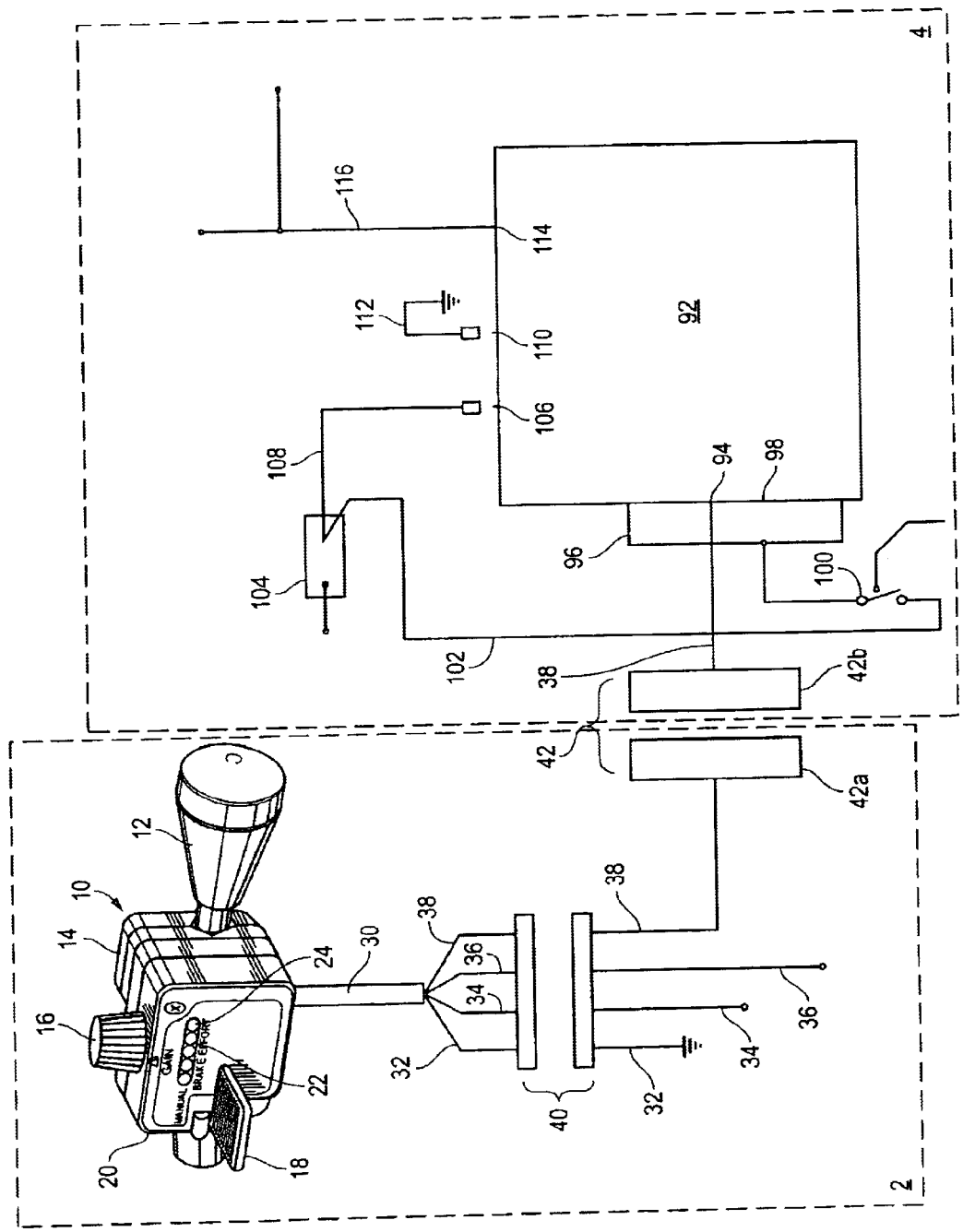
FIG. 2 is a schematic diagram, including a perspective view of a remote control module, of a trailer brake control system in accordance with the principles of the present invention.

FIG. 2 shows the remote braking system of the present invention where a vehicle is towing a trailer, having electronic brakes, as contrasted to towing an automobile as in FIG. 1. For clarity in FIG. 2, those parts of the present invention which in a preferred embodiment are housed in the towing vehicle are shown in box 2 and those part of the present invention that are housed in the towed vehicle are shown in box 4.

Referring to FIG. 2, control module 10 is identical to the control module 10 of FIG. 1 and is coupled to the towed vehicle in a manner similar to that shown in FIG. 1. It will be seen, however, that power module 92 and the manner in which it is connected in the "trailer" system is different.

FIG. 2 shows control line 38 coupled, through hitch socket 42b, to power module 92 at control input 94. Control line 38 is connected to power module 92 using conventional means such as connector 96. Power module 92 produces, in a manner described in greater detail below, a status signal which it returns to control module 10 and status LED 24 through control line 38. Power module 92 further comprises a breakaway switch input 98 connected to breakaway switch 100. Breakaway switch 100 is coupled via line 102 to circuit breaker 104, which is connected to the battery of the trailer, and operates similarly to switch 58 described above. Power module 92 further comprises power input 106 which is connected to the trailer battery via line 108 through circuit breaker 104.

Power module 92 comprises several power outputs, utilizing heavier gauge wire connectors due to the high currents produced as a result of the operation of power module 92. A ground output 110 is provided on power module 92 and appropriate grounding is provided via line 112. Brake power output 114 is connected, via line to the brake magnets of the trailer through line 116. When the microprocessor receives a braking signal from control module 10, it sends a signal to brake power output 114 which operates the brake magnets of the trailer. The brake magnets are conventional commercially available brake magnets, commonly used on trailers.

The sensing of a braking situation in both the towed vehicle and trailer system and the towed vehicle and towed automobile system is identical. In the operation of the system, a braking event results from either a signal being received from the brake light line 36, i.e. as a result of the activation of the brakes in the towing vehicle (which would cause the brake lights of the towing vehicle to light) or by the manual braking lever 18 being actuated by the driver of the towing vehicle. Either of these events will cause a braking signal on control line 38. The braking signal is a pulse width modulated signal which is either proportional to the amount of braking that is sensed or is proportional to the degree to which the manual brake lever 18 is depressed. The manner in which the braking signal is generated will now be described.

Figure 3:
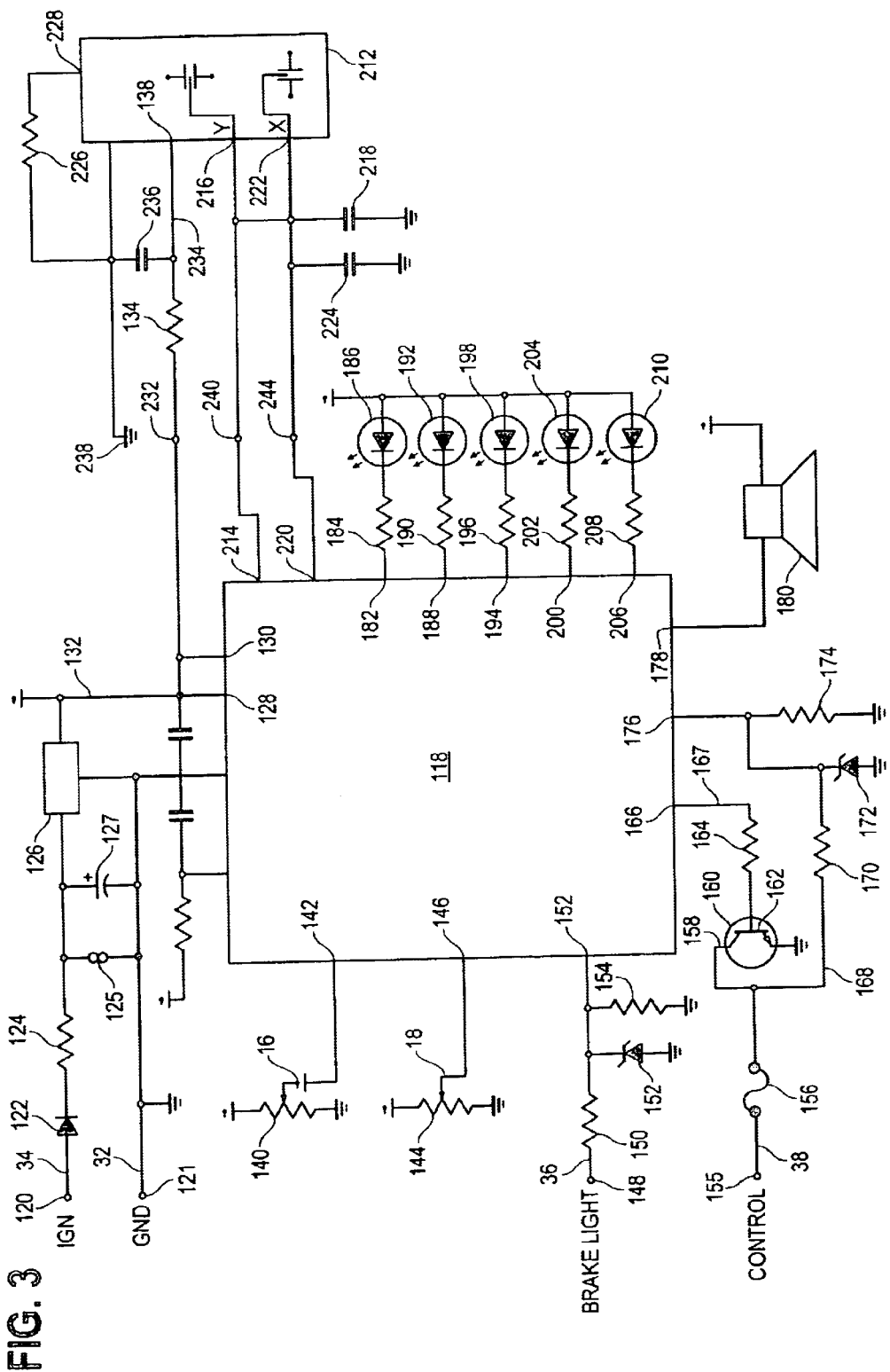
FIG. 3 is an electrical schematic diagram of a control module and accelerometer in accordance with the principles of the present invention.

Referring to FIG. 3, a schematic diagram of a control module 10 in accordance with the present invention is shown. Control module 10 has inputs for each of its components shown in FIG. 1 and FIG. 2. A microprocessor 118 and an accelerometer 212 are provided within control module 10. The accelerometer 212 of the present invention is preferably of a type that can read forces in more than one axis. In the illustrative embodiment, a multi-axis accelerometer is used. Such an accelerometer allows the mounting of the control module without the need for leveling the device. In the illustrative embodiment, a dual axis accelerometer is used. The dual axis accelerometer determines the force of braking, i.e. acceleration, in two axes, e.g. the x and y axes, and sums the acceleration in the x direction with the acceleration in the y direction to determine the total acceleration. This information is provided to the microprocessor 118 so that a braking signal can be generated.

An ignition hookup pin 120 is connected to diode 122 that provides reverse polarity protection and is connected to current limiting resistor 124 which supplies the operating voltage to the voltage regulator 126. Voltage regulator 126 generates a 5 volt output that is fed to microprocessor pin 128 and microprocessor pin 130. The 5 volt line 132 also provides power through resistor 134 to accelerometer pin 138. A ground signal is on pin 121 of the control module that provides a ground return path for all of the voltages used in the control module.

Resistor 124 is also connected to a metal oxide varistor 125 that is connected to ground for surge protection. The voltage line continues and connects to capacitor 127. The other side of capacitor 127 goes to ground. The voltage regulator 126 reference is referenced to ground.

Control module 10 further comprises an adjustment potentiometer 140 that connects to microprocessor pin 142. Potentiometer 140 is used to set the amount of gain, using gain knob 16 (FIGS. 1 and 2). The voltage for the potentiometer comes from the 5 volt regulator and ground and potentiometer 140 generates a voltage proportional to its position. The voltage generated is sent to pin 142 of microprocessor 118. The adjustment of gain allows the driver to adjust the amount of brake force to be applied. The higher the gain is set the more braking force is applied for a given braking situation. In city driving, gain may be kept low as speeds and conditions warrant less braking force. One may also raise the gain to compensate for having a heavy load, for example, when the towed vehicle is large or is carrying a heavy load.

Potentiometer 144 is used to connect the 5 volt power supply and ground to generate a voltage level proportional to the position of the manual brake lever 18 (FIGS. 1 and 2). The voltage level from the manual brake lever 18 is sent to pin 146 of microprocessor 118. Brake light line 36 is connected to brake light pin 148 of control module 10. The brake light signal, generated in the towing vehicle, goes through resistor 150. Zener diode 152, which is connected to resistor 150, is used for voltage translation and noise protection. Brake line pin 148 is coupled to pin 152 of microprocessor 118 through resistor 154. Resistor 154 pulls the line to ground in the event that there is no connection between the brake lights of the towing vehicle and brake line pin 148.

Pin 155 of control module 10 is the control line 38 output of the control module 10. It is coupled to a positive temperature coefficient (PTC) thermistor 156 as a protection device to prevent overcurrent from damaging any of the circuitry in control module 10. The PTC thermistor 156 is coupled to the collector 158 of transistor 160. The base 162 of transistor 160 is connected to resistor 164, which connects to pin 166 of microprocessor 118. This line 167 is used to generate the control signal coming from control module 10. Also connected to PTC thermistor 156 is a line 168, connected to resistor 170, that is connected to zener diode 172 that is connected to ground for voltage translation and noise protection. The cathode of zener diode 172 is connected to resistor 174 which is connected to ground to pull the signal down in the event of no signal on control line 38 (pin 155). The signal is fed to pin 176 of microprocessor 118. On pin 178 of microprocessor 118 a signal is generated that controls a buzzer 180, within control module 10, that provides an audible alert for certain condition concerning the status of the system as described below.

Pin 182 of microprocessor 118 connects to a current limiting resistor 184 that connects to a light emitting diode (LED) 186. LED 186 is the status LED 24 of FIGS. 1 and 2. Pin 188 of microprocessor 118 connects to a current limiting resistor 190 which is connected to LED 192. LED 192 is a braking level indicator. Pin 194 of microprocessor 118 is connected to current limiting resistor 196 which is connected to LED 198 which is a braking level indicator. Pin 200 of microprocessor 118 is connected to current limiting resistor 202 which is connected to LED 204 which is a braking level indicator. Pin 206 of microprocessor 118 is connected to current limiting resistor 208 which is connected to LED 210 which is a braking level indicator. LEDs 192, 198, 204 and 210 form LED display 22 of FIGS. 1 and 2. In the operation of the system the number of braking level indicators that are lighted is an indication of braking force.

Figure 4:
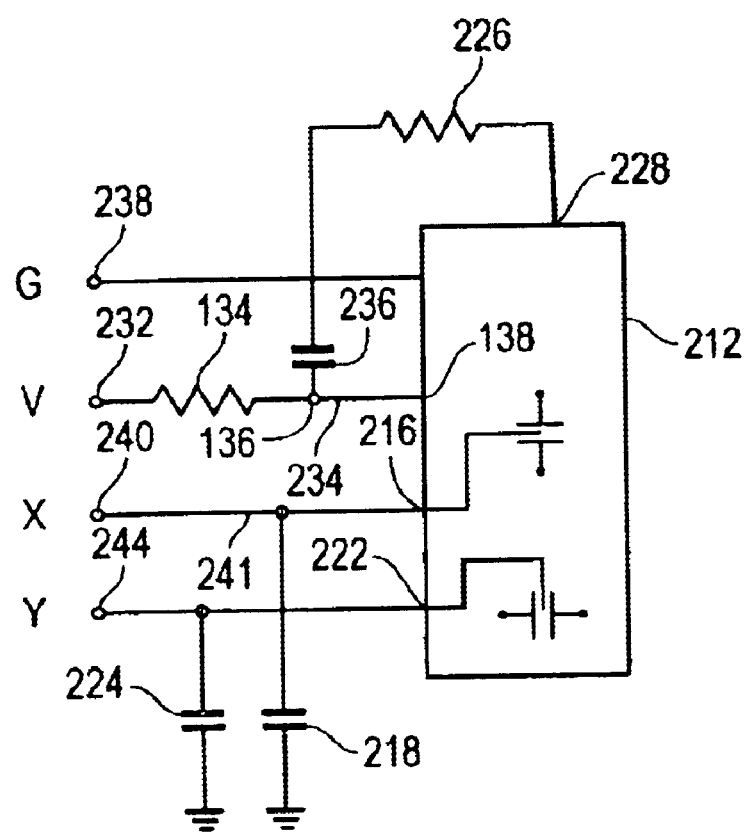
FIG. 4 is an electrical schematic diagram of an accelerometer in accordance with the principles of the present invention.

FIG. 3 shows an accelerometer 212, which is shown in greater detail in FIG. 4, in the form of an integrated circuit. Pin 214 of microprocessor 118 is an input connection reading the accelerometer 212. Pin 214 connects to the Y-axis data output 216 that is filtered through capacitor 218 through the accelerometer 212. Pin 220 of microprocessor 118 is an input connection reading the G-force sensor of accelerometer 212. Pin 220 connects to the X-axis data output 222 that is filtered through capacitor 224 connected to ground. The accelerometer integrated circuit 212 has a resistor 226 that sets the oscillator frequency that is connected in between pin 228 and ground.

Referring to FIG. 4, accelerometer 212 has a power supply input 232 that is connected to resistor 134. Resistor 134 works as a filter element to the power supply to pin 138 of the accelerometer 212 integrated circuit. This line 234 is also connected to the capacitor 236. The other side of 236 connects to the ground pin 238 and to the ground pin 121 of the control module 10. Ground 238 connects to resistor 226. The other side of resistor 226 connects to pin 228 of the accelerometer 212 to set the operating frequency on the internal oscillator. Pin 240, which is the Y-axis data output, of accelerometer 212, connects to pin 216 of the accelerometer 212 and also to capacitor 218. Capacitor 218 connects to ground for low pass filtering of the Y-axis. Pin 244 which is the X-axis data output, connects to the pin-222 of accelerometer 212 and also to capacitor 224 which is connected to ground for low pass filtering of the X-axis.

Figure 5:
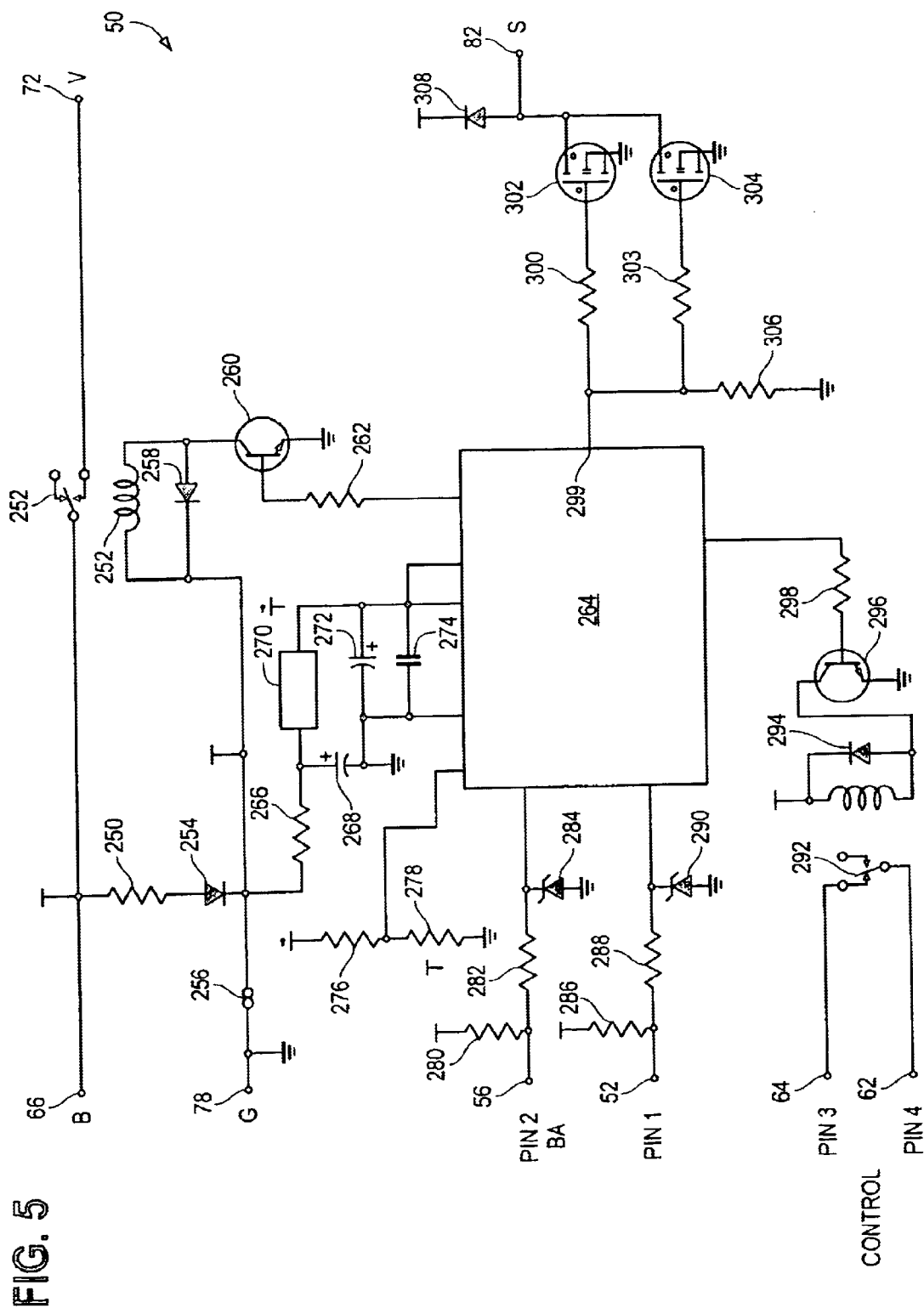
FIG. 5 is an electrical schematic diagram of a car brake system power module in accordance with the principles of the present invention.
Figure 6:
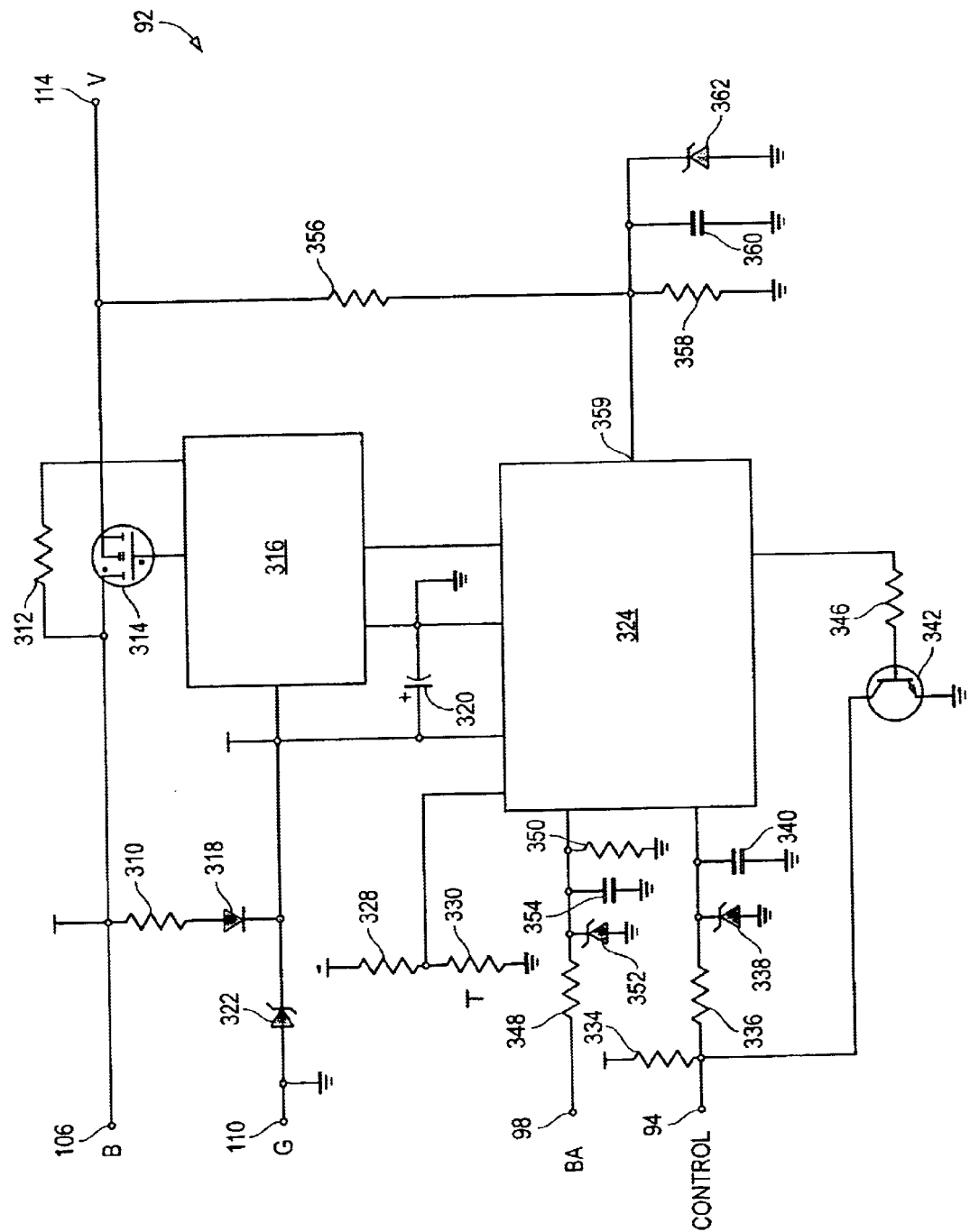
FIG. 6 is an electrical schematic diagram of a trailer brake system power module in accordance with the principles of the present invention.

FIG. 5 is a schematic circuit diagram of the towed automobile brake power module 50 and FIG. 6 is a schematic circuit diagram of the trailer brake power module 92. The control signal generated in control module 10 is received in the power module 50, or the power module 92, and, if the signal is determined to be within the braking parameters programmed into the system, the power modules 50, 92 cause the appropriate braking power to be generated and applied. The control signal is in the form of codes, and in the illustrative embodiment the codes comprise variable duty cycles, such as pulse width modulated duty cycles.

Referring to FIG. 5, the towed car brake power module 50 has a battery line input 66. Battery line input 66 connects to resistor 250 and also to relay 252. Relay 252 continues as an output to vacuum pump output 72. The other side of resistor 250 connects to the anode of diode 254, and the cathode of diode 254 continues to be the 12 volt power supply for the brake module 50. The maximum voltage for brake module 50 is limited by metal oxide varistor 256 which is connected to ground on ground output 78. Relay 252 is connected to output of diode 254 12 volt supply and also to the cathode of diode 258. The anode of diode 258 connects to the other side of the coil of relay 252 which is connected to the collector of transistor 260. The emitter of transistor 260 connects to ground. The base of transistor 260 connects to resistor 262. The other side of resistor 262 connects to an output on microprocessor 264. The 12 volt supply coming from the cathode of diode 254 connects to resistor 266. The other side of resistor 266 connects to the positive plate of capacitor 268. The negative plate of capacitor 268 goes to ground. The positive plate of capacitor 268 is also connected to the input of voltage regulator 270. Voltage regulator 270 connects its reference to ground and has a 5 volt output that connects to capacitor 272 and capacitor 274. The negative plates of capacitor 272 and capacitor 274 connect to ground and also the ground of microprocessor 264. The positive plates of capacitor 272 and capacitor 274 connect to the positive pin of microprocessor 264, to the reset pin of microprocessor 264 and to resistor 276. The other side of resistor 276 connects to thermistor 278 and also to an input pin of microprocessor 264. The other side of thermistor 278 connects to ground.

Breakaway switch input 56 connects to resistor 280, and the other side of resistor 280 connects to the 12 volt supply. Input 56 connects to resistor 282, and the other side of resistor 282 connects to the cathode of zener diode 284 which is connected to ground. This line continues to an input pin of microprocessor 264. Control input 52 connects to resistor 286, and the other side of resistor 286 connects to the 12 volt supply. Control input 52 connects to resistor 288, the other side of resistor 288 connects to the cathode of zener diode 290. The other side of zener diode 290 connects to ground and the line continues to an input pin of microprocessor 264. Brake light switch control line 64 connects to the normally closed pin of relay 292. The common pin contact of relay 292 connects to brake light control line 62. One side of the coil of relay 292 connects to the 12 volt supply and to the cathode of diode 294. The other side of the coil of relay 292 and the anode of diode 294 connect to the collector of transistor 296. The emitter of transistor 296 connects to ground. The base of transistor 296 connects to resistor 298. The other side of resistor 298 connects to an output of microprocessor 264. An output 299 of microprocessor 264 connects to resistor 300, which connects to the gate of transistor 302. Resistor 300 also connects to resistor 302. The other side of resistor 302 connects to the gate of transistor 304. The output 299 also connects resistor 306. The other side of resistor 306 is connected to ground. The source pins of transistor 302 and transistor 304 are connected to ground. The drain pins of transistor 302 and transistor 304 are connected together and connected to actuator output 82 and is also connected to the anode of diode 308. The cathode of diode 308 connects to the battery connection of the control module.

Thermistor 278 is closely coupled to transistor 302 and transistor 304 to sense temperature. While the sensing of the temperature controls the maximum duty cycle to limit the maximum temperature of the transistors. This pulse width modulation technique will prevent damage to the power module device as well as to the actuator it is driving. The heating of the output transistor is matched to the heating of the actuator. This is done by using transistor devices that heat up proportionally to the heating up of the actuators.

Referring to FIG. 6, the power input 106 of trailer brake power module 92 connects to resistor 310 and also connects to resistor 312. The other side of resistor 312 connects to the brake power output 114 of power module 92. Power input 106 also connects to the drain of transistor 314, and the source of transistor 314 also connects to brake power output 114. The gate of transistor 314 connects to driver integrated circuit 316. Brake power output 314 is also connected to driver integrated circuit 316. The other side of resistor 310 is connected to the anode of diode 318, the cathode of diode 318 connects to the 12 volt power source and connects to driver integrated circuit 316 and the capacitor 320 positive plate. Capacitor 320 connects, via its the negative plate, to ground and to the driver integrated circuit 316. The 12 volt supply also connects to the cathode of zener diode 322, and the anode of zener diode 322 connects to ground output 110 of power control module 92.

A microprocessor 324 is provided in power module 92. The 12 volt power supply line from the cathode of diode 318 also connects to the microprocessor power supply input pin 326 and also to resistor 328. The other side of resistor 328 connects to an input pin of microprocessor 324 and also to thermistor 330. The other side of thermistor 330 connects to ground.

Control input 94 connects to positive temperature coefficient (PTC) thermistor 332. The other side of the PTC thermistor 332 connects to resistor 334. The other side of resistor 334 connects to the 12 volt supply. The output of PTC thermistor 332 connects to resistor 336, which performs a level translation filtering of the control signal. The other side of resistor 336 connects to the cathode of zener diode 338; the anode of zener diode 338 connects to ground. The signal on the cathode of zener diode 338 connects to capacitor 340 for filtering of the control signal; the other side of capacitor 340 connects to ground. The positive side of cathode 340 connects to an input pin of microprocessor 324.

Another, connection from the output of PTC thermistor 332 connects to the collector of transistor 342. The emitter of transistor 342 goes to ground while the base of transistor 342 goes to resistor 346. The other side of resistor 346 goes to an output on microprocessor 324. Transistor 342 is used to shunt the control signal upon the absence of a brake magnet presence. Breakaway switch input 98 connects to resistor 348. The other side of resistor 348 connects to resistor 350, which connects to ground, and connects to the cathode of zener diode 352, while the anode of zener diode 352 connects to ground. Breakaway switch input 98 also connects, through resistor 348 to the positive plate of capacitor 354, the negative plate of capacitor 354 connects to ground and the connection continues to an input pin of microprocessor 324. This circuit performs the breakaway input control.

Transistor 314 is used to switch the braking magnets on and off as a function of the control signal coming into power module 92. Resistor 312 is used to deliver current to the brake magnets and is used to determine if the brake magnets are present.

Brake power output 114 is connected to resistor 356, the other side of resistor 356 is connected to resistor 358 which is connected to ground, to form a voltage divider to feed the signal to an input pin 359 on microprocessor 324 to determine if the brake's magnets are present. The cathode of diode 362 is connected to an input pin of microprocessor 92 and to capacitor 360. The anode of diode 360 and the negative plate of capacitor 362 are connected to ground. This provides the input voltage translation and filtering for a brake magnet detection circuitry.

Thermistor 330 is closely coupled to transistor 314 to sense temperature. While the sensing of the temperature controls the maximum duty cycle to limit the maximum temperature of the transistors. This pulse width modulation technique will prevent damage to the power module device.

Figure 7:
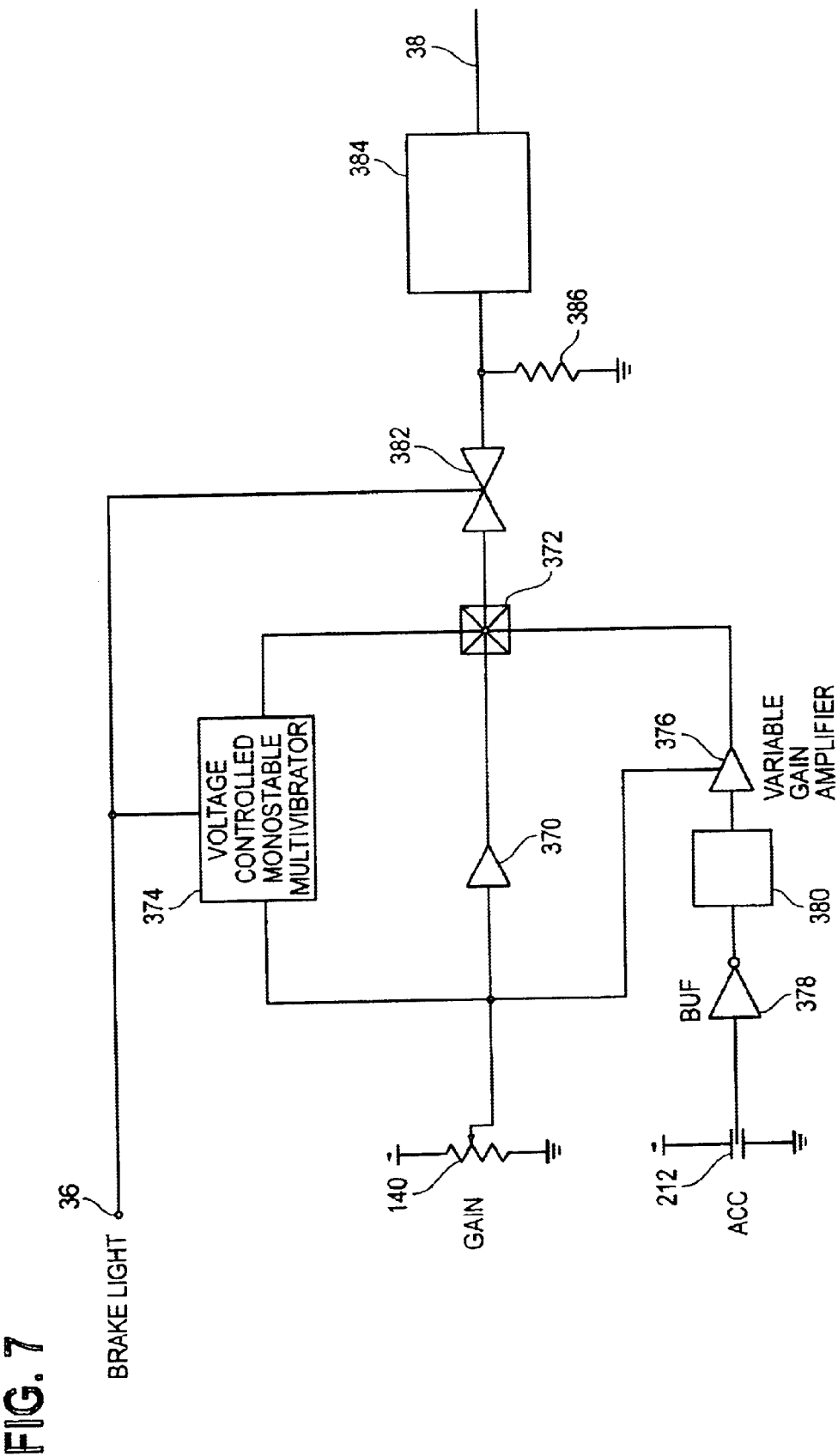
FIG. 7 is an electrical schematic diagram of a gain control circuit in accordance with the principles of the present invention.

Referring to FIG. 7, the gain control circuit signal is originated from a gain control potentiometer 140, that is connected between a 5 volt supply and ground. A proportional output voltage of the rotation of potentiometer 140 goes to a buffer amplifier input 370; the output goes to a summing circuit 372. The voltage output of gain control potentiometer 140 also goes to the voltage control input of a one shot, or voltage controlled monostable multivibrator 374. The voltage control input determines the pulse width output upon triggering. The one shot 374 output is also connected to the summing circuit 372 with the output of buffer amplifier 370. In addition, the output of the gain control 140 voltage goes to a variable gain control input pin of a variable gain amplifier 376. The variable gain amplifier 376 gets its signal from accelerometer 212. The signal from accelerometer 212 goes to the input of buffer 378. The output of buffer 378 connects to a low pass filter 380 and the output of low pass filter 380 goes to the input of variable gain amplifier 376. The output of the variable gain amplifier 376 goes to summing circuit 372.

The output of the summing circuit 372 goes to transmission gate 382, the output of transmission gate 382 goes to the voltage control of the pulse width modulator circuit 384, which also has resistor 386 which is connected to ground. The input of pulse width modulated circuit 384 is zero volts when transmission gate 382 is open. The output of the pulse width modulator 384 is the control signal on line 38 of FIGS. 1 and 2.

Brake light line 36 is connected to the trigger of the voltage control one shot 374 so that when the brake light signal becomes active it initiates a pulse width proportional on the voltage control pin. The brake light signal also continues to the control of the transmission gate 382 that enables the pulse width modulator 384 to receive the signal from the summing circuits.

The overall circuit works where the gain control resistor 140 generates a voltage from the position of the rotation of the potentiometer. The DC output voltage goes and generates a static amount of gain or constant pulse width generated by the pulse width modulator 384 when the brake light is enabled and which is summed with the duration of the one shot 374 that gives it a maximum pulse width or 100% duty cycle for the duration of the one shot 374 pulse and it is also summed with accelerometer 212 whose output of the accelerometer 212 is amplified by the variable gain amplifier 376 as a function of the DC voltage generated by the gain control potentiometer 140.

In the towing vehicle—towed automobile system described above, a braking situation would occur as follows. Referring to FIGS. 1, 3, 4 and 5, when the brakes of the towing vehicle are activated, controller 10 receives an electrical signal from brake light line 36. The signal from brake light line 36 is read by microprocessor 118 to indicate that a braking situation exists. Continually, while the towing vehicle is in operation, microprocessor 118 is polling accelerometer 212 to determine the base line acceleration of the vehicle and the forces due to gravity, or G forces. This polling is being done continually while there is no brake light signal (i.e. whenever the towing vehicle is not in a braking situation). Because roads are rarely level and often roads go up or down hill, polling of the accelerometer gives the microprocessor a basis for determining the amount of force which must be applied. Thus, if the vehicles are traveling uphill and a braking situation occurs, the microprocessor and accelerometer, which are continually determining G forces, will not be fooled into believing that the towing vehicle is exerting greater braking power than it in fact is. Without such polling of the current forces on the vehicles, application of the brakes by the brake controller would be inaccurate, much like in the brake controllers of the prior art.

Upon receiving the brake light signal, microprocessor 118 polls accelerometer 212 to determine the amount of braking occurring, based on accelerometer 212's reading of the instant change in the acceleration of the towing vehicle. Based on the information given by accelerometer 212, and a preprogrammed response in microprocessor 118, a control signal is sent from control module 10 to power module 50. Microprocessor 264, within power module 50, senses the control signal and determines if it is within the acceptable range of control signals. Unacceptable signals could otherwise be determined to be braking situations, for example, if there was a short circuit that caused a signal to be received in power module 50, microprocessor 264 would determine that signal was not an acceptable control signal and would not operate the braking systems of the towed vehicle.

Upon determination that the control signal is within the acceptable range, microprocessor 264 causes power module 50 to secure appropriate power, from the battery of the towed vehicle, so that an appropriate signal, representative of the control signal, may be generated and sent to the actuator 86, which operates the brakes of the towed automobile. Power module 50 also supplies power to a vacuum pump 76 which allows appropriate brake pressure in the towed automobile without the necessity for the towed automobile to have either its engine running or the ignition set to the accessory position. Upon determination that an appropriate braking signal has been received, power module 50 causes vacuum pump 76 to begin continuous operation for the entire length of the braking situation. Upon the cessation of the braking situation, power module 50 continues to cause operation of vacuum pump 76 for a predetermined period of time, preferably 20 seconds, to re-energize the vacuum of the braking system in preparation for the next braking situation.

The power module 50 generates a signal on pin 72 to operate the vacuum pump 76, based upon the braking requirements. The vacuum pump 76 is not the towed vehicle's own vacuum pump but it is a vacuum pump that is supplied with the power module 50 and controller 10. Anytime a breakaway event occurs, a vacuum pump signal is generated. When there is a braking control signal on line 38, the vacuum pump 76 is operated so long as the braking signal continues. Once the braking signal stops, the signal on pin 76 is continued for a predetermined amount of time, preferably twenty seconds, to replenish the vacuum pump 76 in order for it to be in condition to receive the next braking system on the control line 38.

Note that the tow braking control signal is not a continuous signal but is a pulse width modulated signal. The microprocessor 264 and the power module 50 look for the sequence of pulses over an interval and so long as there are pulses occurring within that preprogrammed window, microprocessor 264 determines that the braking event is active. The reception of such a signal causes the microprocessor 264 to run the vacuum pump 76 continuously, so as to provide a continuous source of braking power. However, even when control signals are not within that window, microprocessor 324 maintains the vacuum pump for about 20 seconds, as described above to provide braking power for the next braking situation. Thus when the pulse width modulated pulses stop, there are no longer any pulses at pin 82 and actuator 86 releases, releasing the brakes of the towed automobile. The vacuum pump 76 then continues for a predetermined time. Vacuum pump signal on pin 72 is not a pulse signal but is a continuous level signal.

In the towing vehicle—trailer system described above, a braking situation would occur in a manner similar to that in a towed automobile situation. Referring to FIGS. 2, 3, 4 and 6, when the brakes of the towing vehicle are activated, controller 10 receives an electrical signal from brake light line 36. The signal from brake light line 36 is read by microprocessor 118 to indicate that a braking situation exists.

Upon receiving the brake light signal, microprocessor 118 polls accelerometer 212 to determine the amount of braking occurring, based on accelerometer 212's reading of the instant change in the acceleration of the towing vehicle. Based on the information given by accelerometer 212, and a preprogrammed response in microprocessor 118, a control signal is sent from control module 10 to power module 92. Microprocessor 324, within power module 92, senses the control signal and determines if it is within the acceptable range of control signals. Upon determination that the control signal is within the acceptable range, microprocessor 324 causes power module 92 to secure appropriate power, from the battery of the trailer or the towing vehicle, so that an appropriate amount of power, representative of the control signal, may be generated and sent to the electric brakes of the trailer.

When the system is not braking, microprocessor 118 is polling accelerometer 212 to determine the instantaneous gravitational forces, or G forces.

As noted above, both power module 50 and power module 92 produce and send a status signal to control module 10. The status signal produced by power module 92 is responsive to the brake magnets' integrity. Thus if the brake magnets are not connected, there will be no status signal sent to the status LED 24 of the controller. The power module also sends the status signal to the control module with respect to the integrity of the trailer hitch so that if the trailer is disconnected from the driving vehicle, there will be no signal and the status LED 24 will go out. A status warning alarm, in the form of buzzer 180 (FIG. 3), will also sound if a breakaway condition exists, as will be described below. The status signal produced by power module 50 is responsive to the integrity of the power module.

The hitch socket plug 42 contains many other wires and connectors that couple the towed vehicle functions to the towing vehicle functions. For example, the brake lights and head lights and turn signals of the towing vehicle are coupled to the respective parts of the towed vehicle. Thus when the brake of the towing vehicle is applied, the brake lights of the towed vehicle and the towing vehicle will be energized. The power module 50 has a brake light switch 62 and 64 which is an interrupting relay that disconnects the towed cars brake light switch from its tail lights when there is a brake event. However, the brake lights of the towed vehicle will still go on because it will be on as a result of the respective lines through the hitch. It can be seen that if the towed vehicle is disconnected from the towing vehicle and the breakaway switch 58 is operated, the brake lights of the towed vehicle will go on as well as the towed vehicle braking because the power module 50 has not received a proper braking signal sequence in effect telling the brake light switch relay to interrupt. Referring back to the brake light switch, that is coupled to pins 62 and 64 through a relay. When the brake control signal occurs during a braking event, that relay opens to open the brake light switch circuit thereby cutting off the energization of the brake light of the towed vehicle other than the towed vehicle's energization resulting from the umbilical through the hitch.

It can be seen that a novel vehicle brake controller has been provided which can be used to accurately and safely help to control both towed automobiles and trailers, by enabling the driver of the towing vehicle to apply the brakes of towed vehicles.

Although illustrative embodiments of the invention has been shown and described, it is to be understood that various modifications and substitutions may be made by those skilled in the art without departing from the novel spirit and scope of the invention.

What is claimed is:

1. A vehicle towing system which comprises:
   a towing vehicle for towing a towed vehicle having brakes;
   a brake controller;
   said brake controller including a multi-axis accelerometer; and
   circuitry to sum sensed accelerations of said multi-axis accelerometer and to sense braking forces on said towing vehicle;
   said circuitry being operable to cause the activation of the brakes of the towed vehicle in a manner that is insensitive to the position of the accelerometer.

2. A method of applying the brakes of a towed vehicle when it is in association with a towing vehicle, including the steps of:
   providing a brake controller, said brake controller including a multi-axis accelerometer;
   sensing braking forces on said towing vehicle;
   summing sensed accelerations of said multi-axis accelerometer; and
   activating the brakes of the towed vehicle in response to said summing and sensing steps.

3. A method of applying the brakes of a towed vehicle when it is in association with a towing vehicle, including the steps of:
   providing a brake controller including a multi-axis accelerometer;
   providing a microprocessor;
   generating braking signals in response to braking situations in the towing vehicle;
   providing power drivers; and
   connecting said power drivers such that said braking signals cause said power drivers to engage the brakes of the towed vehicle.

4. A method of applying the brakes of a towed vehicle when it is in association with a towing vehicle, including the steps of:
   providing a brake controller including a multi-axis accelerometer;
   providing a microprocessor;
   via said accelerometer, sensing forces in at least two axes of movement of the towing vehicle;
   via said microprocessor, polling said multi-access accelerometer to determine acceleration forces on the towing vehicle;
   computing changes in acceleration forces on the towing vehicle and generating a braking signal in response thereto;
   braking the towed vehicle in response to said braking signals.

5. A method as described in claim 4, including the steps of providing power drivers and connecting said power drivers such that said braking signals cause said power drivers to engage the brakes of the towed vehicle.

6. A method as defined in claim 4, including the steps of coupling said microprocessor to the braking system of the towing vehicle, with said microprocessor generating a braking signal in response to changes in forces computed from reading the accelerometer only when the brakes of the towing vehicle are engaged as sensed by said microprocessor.

7. A method of applying the brakes of a towed vehicle when it is in association with a towing vehicle, including the steps of:
   providing a brake controller, said brake controller including a multi-axis accelerometer;
   via said accelerometer, determining the force of braking by determining the acceleration in two axes;
   summing the acceleration in one axis with the acceleration in the other axis to determine the total acceleration;
   providing braking signals to a microprocessor in response to the determined total acceleration; and
   activating the brakes of the towed vehicle in response to signals provided by said microprocessor.

8. A method of applying the brakes of a towed vehicle when it is in an association with a towing vehicle, including the steps of,
   providing a brake controller, said brake controller including a multi-axis accelerometer,
   sensing braking forces on said towing vehicles;
   summing sensed accelerations of said multi-axis accelerometer;
   activating the brakes of the towed vehicle in response to said summing and said sensing steps in a manner that is insensitive to the position of the accelerometer.

* * * * *